US012759799B2

(12) United States Patent
De Wit et al.

(10) Patent No.: US 12,759,799 B2
(45) Date of Patent: Oct. 13, 2026

(54) MODULAR INSULATING SYSTEM

(71) Applicant: TPI-POLYTECHNIEK B.V., 's-Hertogenbosch (NL)

(72) Inventors: Roy De Wit, 's-Hertogenbosch (NL); Peter Willi Gerrit Markert, 's-Hertogenbosch (NL)

(73) Assignee: TPI-POLYTECHNIEK B.V., 's-Hertogenbosch (NL)

(*) Notice: Subject to any disclaimer, the term of this patent is extended or adjusted under 35 U.S.C. 154(b) by 59 days.

(21) Appl. No.: 18/839,881

(22) PCT Filed: Feb. 20, 2023

(86) PCT No.: PCT/NL2023/050081
§ 371 (c)(1),
(2) Date: Aug. 20, 2024

(87) PCT Pub. No.: WO2023/158312
PCT Pub. Date: Aug. 24, 2023

(65) Prior Publication Data

US 2025/0153951 A1 May 15, 2025

(30) Foreign Application Priority Data

Feb. 21, 2022 (NL) .................................... 2031015

(51) Int. Cl.
*B65G 21/08* (2006.01)
*B32B 1/08* (2006.01)
(Continued)

(52) U.S. Cl.
CPC ................ *B65G 21/08* (2013.01); *B32B 1/08* (2013.01); *B32B 5/18* (2013.01); *B32B 7/02* (2013.01);
(Continued)

(58) Field of Classification Search
CPC ........ B65G 21/08; B65G 21/06; B65G 21/00; B32B 1/08; B32B 5/18; B32B 7/02;
(Continued)

(56) References Cited

U.S. PATENT DOCUMENTS 3,878,936 A 4/1975 Niggemeyer
4,093,066 A * 6/1978 Mitchell ................ B67C 3/007 198/860.4
(Continued)

FOREIGN PATENT DOCUMENTS

CN 105668134 A * 6/2016 ............ B65G 21/08
FR 2454986 A1 11/1980
WO 8202475 A1 8/1982

OTHER PUBLICATIONS

Unknown "Insulated Belt Convayor", Business case request, Oct. 17, 2022, pp. 1-4, Fibo Intercon A/S, Denmark.

*Primary Examiner* — James R Bidwell
(74) *Attorney, Agent, or Firm* — The Webb Law Firm

(57) ABSTRACT

A modular insulating system for establishing a thermally insulated connection between a first environment and a second environment and a casing segment for use in the modular insulating system are disclosed. The first environment and second environment are mutually separated by an intermediate environment, in particular the open air. The modular insulating system is configured for enabling insulated transport of a product from the first environment to the second environment in particular through the intermediate environment.

20 Claims, 4 Drawing Sheets

(51) Int. Cl.

| | |
|---|---|
| ***B32B 5/18*** | (2006.01) |
| ***B32B 7/02*** | (2019.01) |
| ***B32B 27/06*** | (2006.01) |
| ***B65G 21/00*** | (2006.01) |
| ***B65G 21/06*** | (2006.01) |

(52) U.S. Cl.
CPC ............ *B32B 27/065* (2013.01); *B65G 21/06* (2013.01); *B32B 2307/304* (2013.01); *B32B 2307/72* (2013.01); *B32B 2597/00* (2013.01); *B65G 21/00* (2013.01)

(58) Field of Classification Search
CPC ............ B32B 27/065; B32B 2307/304; B32B 2307/72; B32B 2597/00
USPC ................................ 198/860.1, 860.2, 860.3
See application file for complete search history.

(56) References Cited

U.S. PATENT DOCUMENTS

| | | | | |
|---|---|---|---|---|
| 4,366,177 | A * | 12/1982 | Wells ....................... | A21B 1/48<br>426/243 |
| 5,947,266 | A | 9/1999 | Rionde | |
| 7,886,897 | B2 * | 2/2011 | Johanssen .............. | B65G 21/08<br>198/860.3 |
| 2002/0179419 | A1 * | 12/2002 | Tomlinson ............. | B65G 21/02<br>198/860.1 |

* cited by examiner

MODULAR INSULATING SYSTEM

CROSS-REFERENCE TO RELATED APPLICATIONS

This application is the United States national phase of International Patent Application No. PCT/NL2023/050081 filed Feb. 20, 2023, and claims priority to The Netherlands Patent Application No. 2031015 filed Feb. 21, 2022, the disclosures of which are hereby incorporated by reference in their entireties.

BACKGROUND OF THE INVENTION

Field of the Invention

The present invention relates to a modular insulating system for establishing a thermally insulated connection. The invention also relates to a casing segment for use in a modular insulating system according to the invention.

Description of Related Art

In transport of products there is often a phase where a product, or a subpart of said product is to be transported from one environment to another environment. During transport from one environment to the other environment, the product may be subject to substantial temperature fluctuations. Said temperature fluctuations are in particular present in case the two environments are two mutually separated buildings, wherein the product has to pass through an outside area, or intermediate area, which could have a substantially different temperature with respect to the temperatures inside said buildings.

It is known to apply an insulating system for insulating a product during transport from one environment to another. These systems most often are custom built systems, which are adjusted to a specific application. In these cases, it is known that an existing conveyor system, that transports the product from one environment to the other environment, is insulated. However, these systems tend to be prone to leaks in the insulation, since insulation is built around the conveyor system. These leaks may negatively affect the product to be transported. Moreover, since these conveyor systems are mostly uniquely built to a specific purpose, it is difficult to provide for an easy system that is suitable for multiple conveyor systems. This is mostly due to the fact that the insulating systems are purpose built. That is, large sheets of insulating material are cut to size, in order to form a suitable insulating system for the conveyor system. It is a cumbersome task to cut the sheets of insulating material into the correct size, and due to manufacturing tolerances, leaks are easily introduced in the insulating system since adjacent parts do not perfectly align.

It is a first goal of the invention to provide a more easily adjustable insulating system.

It is a second goal of the invention to provide an insulating system that provides for better insulation.

It is a third goal of the invention to provide a modular insulating system that is easier to install.

SUMMARY OF THE INVENTION

The present invention thereto proposes a modular insulating system for establishing a thermally insulated connection between a first environment and a second environment, said first environment and second environment being mutually separated by an intermediate environment, in particular the open air, the modular insulating system being configured for enabling insulated transport of a product from the first environment to the second environment, in particular through the intermediate environment, the system comprising at least one upper casing segment and at least one lower casing segment, wherein said upper casing segment and said lower casing segments are mutually connected or connectable, wherein at least one upper casing segment and/or at least one lower casing segment are at least partially composed out of a, preferably foamed, polymer material, wherein, in connected condition, the upper casing segment and lower casing segment form a casing part, wherein said casing part defines an insulated channel having a first opening and a second opening, wherein the first opening of the insulated channel is configured to debouch into the first environment, and wherein the second opening of the insulated channel is configured to debouch into the second environment, such that the insulated channel defines an insulated transport bridge between the first environment and second environment.

The modular insulating system according to the present invention provides a good insulating performance whilst being relatively easily adjustable. Therefore, the present invention may provide for a more easily adjustable system, since the upper casing part and lower casing part are mutually connected or connectable. As such, a casing part may be more easily established in order to define said insulated channel. It is preferred that at least one the upper casing segment and/or at least one lower casing segment is at least partially composed out of a foamed polymer material. The foamed polymer material may increase the insulating properties of at least one upper casing segment and/or lower casing segment. The casing part, which is defined by the coupled or connected upper casing segment and lower casing segment, defines the insulated channel. In particular, the insulated channel is defined by an interior surface of said casing part.

The modular insulating system according to the present invention may also be more easily installed compared to prior art. This may be due to the upper casing segment and lower casing segment, which may be easily mutually coupled such as to form a casing part. As such an easy way to form an insulated channel may be established.

For establishing a better insulation between the first environment and the second environment, it is preferred that the casing part at least partially received and/or connected to, preferably at either end thereof, by the first environment and the second environment. In case the first and second environment are formed by two separate buildings, it is conceivable that the casing part is at least connected, preferably at least partially protruding, to at least one and preferably both of the buildings at respective ends of the casing part. Hence, as such the first opening of the insulated channel debouches into the first environment and the second opening of the insulated channel debouches into the second environment, in order to form an insulated transporting bridge. That is, when said casing part is connected to the first environment and/or second environment, a product may be transported through the insulated channel. Where in this respect connection is mentioned, it should be understood that a connection between the casing part and the first environment and/or second environment may be formed in alternative ways, for example by means of a casing connector attached to one of said environments. It is also conceivable that the first environment and the second environment are parts of a single building, wherein the insulated channel is configured for establishing an insulated connection between said different parts, being the first environment and second environment, of the building. The invention should therefore not be limited to the examples discussed.

Preferably, the casing part prevents air that is outside of the insulated channel, in particular outside of the casing part, from penetrating or entering the insulated channel. That is, preferably the mutually connected upper casing segment and lower casing segment are connected such that airflows from outside of the casing part are substantially entirely blocked. Therefore, the besides the first and second opening, the casing part is substantially free of holes, which allows for better insulating properties. Free of any holes means that the present invention is strong as such, e.g., self-carrying, such that there is no need to construct the insulating system around an existing transport system. Moreover, free of any holes may be understood as preferably comprising no holes, except for mounting points, such as holes for screws and/or bolts, and except for drainage holes. Therefore, free of holes may be understood as not comprising holes with a surface area larger than 1 cm2, preferably larger than 3 cm2, more preferably larger than 8 cm2.

The wording upper casing segment and lower casing segment are used for identification purposes, and should not be understood to limit the present invention. Where reference is made to an upper casing segment and/or where reference is made to a lower casing segment, reference may also be made to e.g., a left casing segment and/or to a right casing segment, or alternatives thereof. The wording upper casing segment and lower casing segment and/or left casing segment and right casing segment do not exclude the presence of a further casing segment. Where there are three or more casing segments, which mutually define the casing part, the casing segments could be referred to as a first casing segment, a second casing segment, and a third casing segment. The present invention is thereto not limited.

Preferably, the upper casing segment and/or the lower casing segment are essentially entirely composed out of foamed polymer material. A casing part, in coupled condition may in such instance form a full polymer foam enclosure. Thus, essentially an entire circumference formed by the casing part is formed out of foamed polymer material. This is in particular beneficials since typically it is required that at a location where casing segments are adjoined different materials are used, which compromises the insulating properties. The present invention allows for establishing a full polymer foam enclosure. As such, also the location of the coupling profile forms a thermal bridge between an interior side and an exterior side of the insulating channel. It is preferred that the at least one upper casing part and/or lower casing part are rigid.

It is preferred that at least one of the upper casing segment and/or lower casing segment is configured for carrying at least a part of a transporting conveyor, in particular such that said casing part is formed around said conveyor. Preferably, the casing part stretches essentially entirely around the transporting conveyor, in particular said foamed polymer material stretches essentially entirely around said transporting conveyor. Hence, preferably said transporting conveyor may be situated at least partially inside the insulated channel. Preferably, the upper casing segment and lower casing segment for, in coupled condition, a substantially rigid casing part. This may allow easy transport of products from the first environment to the second environment through the intermediate environment, in particular the open air. To this end, at least one upper casing segment and/or at least one lower casing segment may comprise a supporting surface, for at least partially supporting a part of a transport system, such as a conveyor. In fact a transport system may be substantially entirely, or at least partially, housed inside the insulated channel. Also the mounting brackets for a transport system may be provided inside a casing part. This may greatly influence the overall insulating properties of the system, since regular insulating systems are often built around a transport system, wherein said transport system is mounted on the ground. Therefore, holes for allowing support structures of the transport systems according to the prior art are not required by the present invention since the casing parts are configured for internally carrying a part of a transport system. It is also conceivable that said casing part is composed out of a single part, i.e., wherein the upper casing segment and lower casing segment are integrally formed. In order to access the insulated channel, an opening may be provided, wherein the modular insulating system comprises a closing element, for closing the opening in the casing part. Preferably said closing element is a movable closing element, in particular wherein the closing element is movable between a closed position, wherein the closing element substantially entirely closes the opening in the casing part, and an open position, wherein the opening in the casing part is at least partially uncovered by the closing element.

Preferably, the upper casing segment and lower casing segment are provided with first co-acting coupling profiles and second co-acting coupling profiles, for mutually connecting the upper casing segment and lower casing segment. At least one of said first co-acting coupling profiles is configured to co-act with at least one of said second co-acting coupling profiles. At least one of said second co-acting coupling profiles is configured to co-act with at least one of said first co-acting coupling profiles. In this respect, the first co-acting coupling profiles and second co-acting coupling profiles may also or alternatively be referred to as coupling structures or coupling edges. It is conceivable that said first co-acting coupling profiles and second co-acting coupling profiles allow to at least partially guide the upper casing segment and lower casing segment into a connected condition. The first co-acting coupling profiles and second co-acting coupling profiles are preferably configured such that any upper casing segment may be connected or connectable to any bottom casing segment, which may contribute to the ease of assembly of the insulated system according to the invention. This is of particular benefit in case multiple upper casing segments and multiple bottom casing segments are provided. As an alternative wording for first co-acting coupling profiles and second co-acting coupling profiles are described, use may also be made of the wording wherein at least one upper casing segment and/or at least one lower casing segment are provided with complementary coupling profiles configured for mutually connecting said upper casing segment and said lower casing segment. The same benefits as described in this paragraph apply to the complementary coupling profiles.

At least one upper casing segment and/or at least one lower casing segment preferably comprises two spaced apart edges, wherein a first coupling profile and a second coupling profile are provided on respective first edges and second edges of the upper casing segment and lower casing segment. At least one first coupling profile and/or at least one second coupling profile may also be referred to as first co-acting coupling profiles and/or second co-acting coupling profiles. Preferably said first co-acting coupling profiles and second co-acting coupling profiles are in particular elongated, stretching over at least a part of the length of the upper casing segment and/or lower casing segment. Preferably, the at least first and/or second coupling profile stretches along essentially the entire length of one of the spaced apart edges. Said first edges and second edges of the upper casing segment and lower casing segment are, in connected condition, preferably mutually facing each other. The first edges and second edges of the upper casing segment and/or lower casing segment may thus be mutually separated by a part of the insulated channel, in particular a part of the width of said insulated channel may mutually separate the first edges and second edges. Hence, when the upper casing segment and lower casing segment are mutually connected, they enclose said width of the insulated channel. Where reference is made in this application to the first edges and second edges, also use can be made of the wording first walls and second walls, or first wall parts and second wall parts. Preferably, at least a part of the first coupling profile and/or at least a part of the second coupling profile at least partially extends in a direction substantially parallel to the longitudinal direction of the insulated channel. Where reference is made to for example complementary coupling profiles, at least a part of the complementary coupling profiles extends in a direction substantially parallel to the longitudinal direction of the insulated channel. In this respect, however, the same advantages apply. This direction has proven to establish a mutual connection more easily, since the coupling profiles extend in the same direction as the insulated channel. Although the first co-acting coupling profiles and second co-acting coupling profiles preferably extend at least partially parallel to the insulated channel, this does not exclude that the first co-acting coupling profiles and second co-acting coupling profiles extend in a direction perpendicular to the insulated channel, for example in an end region of the casing segments.

In an embodiment according to the present invention at least one of the first co-acting coupling profiles and/or second co-acting coupling profiles are formed by a tongue and groove. Where reference is made to for example complementary coupling profiles, at least one of the complementary coupling profiles comprises a tongue and/or groove, wherein the groove of a first coupling profile is configured for at least partially receiving a tongue of a connected second coupling profile of another casing segment. In this respect, however, the same advantages apply. Preferably, wherein the groove of a first coupling profile is configured for at least partially receiving a tongue of a connected second coupling profile of another casing segment. It is also conceivable that at least one of the first and second co-acting coupling profiles are formed by a double tongue and/or groove. Preferably, wherein at least one of the first co-acting coupling profile comprises at least two grooves, configured for at least partially receiving at least two tongues of a connected second coupling profile of another casing segment. However, alternatives thereto, such as at least one of the first co-acting coupling profiles comprising two tongues, configured to be at least partially received by two grooves of a connected second coupling profile of another casing segment are also conceivable. Another alternative may be that at least one first co-acting coupling profile may comprise both a tongue and a groove, configured for co-acting with a groove and tongue of at least one second co-acting coupling profile. The tongue and groove couplings allow for an easy coupling of the upper casing segment and lower casing segment. Moreover, said tongue and groove may also be beneficial to the thermal insulating properties since it may form a thermal bridge between in- and outside of the casing part.

It is conceivable that at least one of the upper casing segment and/or lower casing segment comprises at least one locking element. Said locking element is preferably configured for mutually locking at least one upper casing segment and at least one lower casing segment. Preferably, at least in a direction away from and towards each other. The at least one locking element preferably allows the casing part formed by said upper casing segment and lower casing segment to be structurally mutually connected. At least one locking element may for example be formed by a movable hook attached to, or integrally formed by a hingeable part of, at least one upper casing segment and/or at least one lower casing segment, wherein said hook may in particular be configured to co-act with a recess or slot in/of at least one other casing segment, in particular in order to establish mutual locking. It is also conceivable that at least one of the upper casing segment and/or lower casing segment is provided with a plurality of locking elements. Preferably, at least one locking element is provided on either side of a casing element. That is, on opposing sides where the upper casing segment and lower casing segment forming the casing part. Preferably, at least one locking element is formed by, or comprises, a locking portion and a receiving portion, for mutually establishing a releasable locking connection. In this respect, the locking element may also be referred to as locking structure. It is beneficial in case the locking element or locking structure is releasable, such that the casing part may be easily disassembled in case of maintenance. At least one of the locking portion and/or receiving portion may be provided on or integrally formed with one of the upper casing segment and/or lower casing segment. Such an integrally formed receiving portion may for example be a recessed portion in one of the upper casing segment or lower casing segment. The upper and lower casing segment may also be provided with co-acting locking elements, for mutually locking the upper and lower casing segment, at least in a direction away from and towards each other. The co-acting locking elements may be formed by e.g., a locking portion and a receiving portion. The co-acting locking elements are formed for example by co-acting latch parts comprising a locking portion and a receiving portion, for mutually establishing a releasable locking connection. such as a cam latch, twist latch, hook latch, pull down latch, toggle latch, slam latch, push to close latch, and/or a slide latch.

Preferably at least one upper and/or at least one lower casing segment are substantially identical casing segments, in particular entirely identical casing segments. This allows the insulating system to be substantially simpler to manufacture compared to existing solutions. Said identical casing segments may for example be formed by using a mould. Preferably, at least one upper casing segment and/or at least one lower casing segment is made via casting. Preferably, said identical casing segments mutually define a substantially straight casing part which defines a substantially straight insulated channel. However, the first environment and second environment do not necessarily have to be connected in straight lines only. Therefore, said identical casing segments may be easily adjusted such as to define bends in case multiple casing parts are installed.

In a beneficial embodiment according to the present invention, one end of at least one casing segment may be cut at an angle, for example at an angle of 10 degrees, 20 degrees 30 degrees, 40 degrees, 45 degrees, 50 degrees. This allows the modular insulating system to form a bend in the insulated channel, in particular when another casing part is connected. By applying said angle with respect to a horizontal plane an upward and/or downward bend may be established. By applying said angle with respect to a vertical plane a left and/or right bend may be established. Hence, by applying multiple angles an insulated channel may be formed by adjacent casing parts with multiple bends, to allow more freedom in the areas to be mutually connected by the insulated channel. It is also conceivable that an angle may be applied with respect to both the vertical and the horizontal plane, to establish a diagonally directed bend.

In an embodiment according to the invention the foamed polymer material is a polyurethane foamed material, or polyurethane foam. Foamed polyurethane material is highly suitable as an insulating material for its insulating properties. The foamed material may have a closed cell and/or an open cell structure, preferably the material may on its own be sufficiently rigid. Moreover, in particular in case the casing segments are formed in a mould, foamed material provides the benefit that the manufacturing of the upper casing segments and/or lower casing segments is relatively simple.

Preferably In a beneficial embodiment, at least one of the upper casing segment and/or lower casing segment comprises at least one skin layer, in particular a substantially rigid skin layer. Said skin layer may in particular be substantially rigid, such that said skin layer allows for outdoor applications. Therefore, the skin layer may protect the interior of the casing part and/or at least one casing segment from rain, sun, hail and the like. In particular since foamed material may be more prone to outdoor environments, it is of benefit to provide for a skin layer. To this end the skin layer is preferably substantially free of cavities, and/or have a substantially solid structure. It is even of more benefit in case the entire upper casing segment or lower casing segment is composed out of a foamed polymer material which is substantially surrounded by a skin layer. In this case the skin layer may, due to its more rigid properties, define a sandwich panel. Preferably, the skin layer defines a substantial part, preferably the entire, exterior surface of at least one of the upper casing segments and/or lower casing segment. As such a rigid sandwich panel is established since said skin layer may be rigid. At least one skin layer preferably has a higher density and/or a higher rigidity with respect to the foamed polymer material. The foamed polymer material and/or the skin layer, preferably the combination thereof may be strong as such, preferably free of additives. That is, there is no need for reinforcing the material, but alternatively reinforcing additives and/or particles may be applied within the (foamed) polymer material. Such particles may for example be fibers such as e.g., natural fibers, glass fibers, or the like. The skin layer may in particular have a compression strength in the range of 0.5 MPa to 5 MPa. Preferably, in a direction parallel to the skin, the compression strength of said skin layer is situated between 2 MPa and 5 MPa, preferably between 2.5 MPa and 3.5 MPa. In a direction substantially parallel to said skin, the compression strength may be situated between 0.5 MPa and 2.5 MPa in particular 1.5 MPa. The compression strength values may be subject to a deviation of plus or minus 0.25 MPa. Moreover, the E-module.

Preferably, at least a part of the rigid skin layer, if applied, forms an integral part of at least one upper casing segment and/or at least one lower casing segment, in particular of the (foamed) polymer material. Hence, said skin layer is preferably at least partially formed out of the same polymer material. Said skin layer is preferably integrally formed with the foamed polymer material. In particular, said skin layer and foamed polymer material are formed in a single production step. The formation of at least one skin layer may be established during molding of the upper casing part and/or lower casing part. At least part of the skin layer preferably has a density which is higher than the density of the foamed polymer material. The skin layer may for example have a density which is at least two times bigger compared to the foamed polymer material, preferably at least three times, more preferably at least four times. The density of the skin layer, in particular an average density of the skin layer, is preferably situated between 350 kg/m3 and 550 kg/m3, preferably between 400 kg/m3 and 500 kg/m3, more preferably 450 kg/m3. The foamed polymer material preferably has a density, in particular an average density, situated between 50 kg/m3 and 115 kg/m3, preferably between 75 kg/m3 and 105 kg/m3, more preferably 95 kg/m3. The densities mentioned should be understood with a deviation of about 50 kg/m3, preferably about 25 kg/m3, in particular about 10 kg/m3.

Preferably at least one of the upper casing segment or lower casing segment is essentially entirely composed out of a polymer material, preferably polyurethane, wherein the skin layer at least partially, preferably entirely, encloses the polymer material. In the transition from foamed polymer material to skin layer a density transition gradient is present. Preferably the density gradient in the transition zone from foamed polymer material to the skin layer is situated between 35 kg/m3 per mm and 160 kg/m3 per mm, preferably between 35 kg/m3 per mm and 140 kg/m3 per mm. Preferably, a maximum density gradient in the transition zone from foamed polymer material to the skin layer is about 100 kg/m3 per mm, preferably about 140 kg/m3 per mm, more preferably about 160 kg/m2 per mm. Wherein said gradient is measured from the outer surface of the skin layer. The skin layer preferably has a thickness of at least 1 mm, preferably between 1 mm and 10 mm, more preferably between 2 mm and 5 mm, in particular 4 mm. Preferably the average density of the skin layer is at least double the density of the foamed polymer material, more preferably at least three times, in particular at least four times.

In an embodiment the modular insulating system comprises a plurality of adjacent casing parts, at least one casing part, preferably each casing part comprising an upper casing segment and a lower casing segment, wherein the adjacent casing parts together define the insulated channel having a first and a second opening. The adjacent casing parts allow for defining a bigger insulated channel. The modular insulating system may for example comprise at least two adjacent casing parts, preferably at least four adjacent casing parts, more preferably at least six adjacent casing parts. The amount of adjacent casing parts may be arbitrarily chosen, such that a desired distance to be covered between the first environment to the second environment is covered. The modular insulating system may bridge a distance of at least 1 m, preferably at least 4 m, more preferably at least 6 m. To this end, preferably at least one casing part has a length of about 1 m. This allows different distances to be bridged by the modular insulating system, by choosing the required amount of casing parts. It is conceivable that adjacent casing parts have a different length. Hence, the insulated channel may stretch through the entire intermediate environment. Therefore, the flexibility of the applicability of the present invention is greatly improved. This is mostly due to the fact that the amount of casing parts may be chosen such that any distance may be covered whilst maintaining proper insulating properties. For example, the present invention allows insulated transport from one environment, which may be a building, at a temperature of 20 degrees Celsius, to another environment, which may be another building, also at a temperature of 20 degrees Celsius, through an intermediate environment at a substantially different temperature. Even in case the intermediate environment, which may be an outside environment, the temperature is-20 or 40 degrees Celsius, wherein the insulated channel has a length of 40 m, the exterior temperature of a product passing through the insulated channel does not change more than 1.5 degrees Celsius. Hence, at a temperature difference between the inside of the insulated channel and the intermediate environment of 40 degrees Celsius, the exterior temperature of objects to be transported only increase in temperature at a rate of 0.0375 degrees Celsius per meter travelled. In this example, temperatures of the environment may be subject to a deviation of plus or minus 5 degrees Celsius. The temperatures of the product may be subject to plus or minus 0.5 degrees Celsius. The present invention however does not require the first environment and second environment to have an identical temperature.

In an embodiment according to the invention, at least one of adjacent casing parts are mutually at least partially overlapping in a connected configuration. This may prevent air from the intermediate environment from entering into the insulated channel formed by the adjacent casing parts. Preferably, at least one of the upper casing segment or lower casing segment is provided with a shielding section, wherein a seam and/or opening between adjacent casing parts is at least partially shielded by the shielding section. In particular, the overlap between adjacent casing parts may at least partially be established by the shielding section. The shielding section as such may also protect the casing part it overlaps with from the weather. As such, the shielding section may prevent water, such as rain, from penetrating into the insulated channel.

It is preferred that at least one casing part comprises at least one coupling element or coupling structure, for, preferably releasably, coupling at least one casing part with at least one adjacent casing part. Mutually attaching casing parts may contribute to the overall integrity of the insulating system. Said coupling element or coupling structure may for example be formed by holes provided on either end of at least two casing parts, preferably each casing part. A bolt or pin may be used to mutually connect two casing parts by using said holes provided therein. Preferably, said holes align when the casing parts have a predetermined amount of overlap between them. Hence, wherein a hole provided in a first end of a first casing part may align, preferably concentrically, with a hole provided in a second end of a second casing part. The bolt or pin may be used to mutually attach the casing parts via the, preferably concentrically, aligned holes. Preferably, one of the holes is larger compared to the bolt or pin to allow at least one casing part to move with respect to the other, in particular in a direction perpendicular to the bolt or pin to absorb expansion and/or compression of casing segments due to temperature differences in the intermediate environment.

Preferably at least one upper casing segment and/or at least one lower casing segment comprises a shielding section, for shielding at least a portion of an adjacent casing segment. More preferably, both the upper casing segment and lower casing segment are provided with a shielding section, for shielding at least a portion of an adjacent casing segment. Said shielding section may in particular cover any gap that may be present between two adjacent casing segments or casing parts. Preferably, the shielding segment of the upper casing segment is identical to the shielding section of the lower casing segments. Preferably, the shielding section is formed by a, preferably integral, widened part of the upper casing segment and/or lower casing segment. That is, said shielding segment is bigger compared to the main body of the upper and/or lower casing segment, to properly shield a part of an adjacent casing segment. When the upper casing segment and lower casing segment mutually form a casing part, i.e., when connected, preferably at least the upper casing segment comprises a shielding section, such that said shielding section may cover a gap between adjacent upper casing segments of adjacent casing parts. This may prevent rain from entering the insulated channel, and further contributes to the insulating properties. When both casing segments of a casing part comprise a shielding section, it may also be referred to as said casing part comprising a shielding section In an embodiment at least one shielding section is configured for at least partially receiving at least a part of at least one adjacent upper casing segment and/or for at least partially receiving at least a part of at least one adjacent lower casing segment, such that the adjacent casing segment at least partially overlaps with the shielding section. When a casing part comprises a shielding section, said shielding section is configured for at least partially receiving at least a part of an adjacent casing part, such that the adjacent casing parts at least partially overlap.

Preferably at least one casing part, preferably at least one upper casing segment and/or at least one lower casing segment, is provided with, or comprises, at least one sealing element. The shielding element preferably configured for establishing a sealed connection between adjacent casing parts. Said sealing element may for example be a rubber seal, or a flexible or resilient polymer material which is configured for closing a gap between adjacent casing parts and/or between adjacent casing segments. Said rubber seal may for example be provided in a seal recess. Said seal recess may be provided on an exterior end portion of a casing part and/or casing segment. As such, a rubber seal or said sealing element may be provided in the seal recess. The sealing element may protrude with respect to the exterior surface of the casing part and/or a casing segment, such that when said end of the casing part and/or casing segment is received by a shielding section of an adjacent casing part and/or casing segment, the sealing element mutually seals said adjacent casing parts and/or casing segments. Preferably, at least a part of an exterior surface and/or at least a part of an interior surface of at least one upper casing segment and/or at least a part of an exterior surface and/or at least a part of an interior surface of at least one lower casing segment comprises a sealing element. Preferably, a connection between the casing part and the first environment and/or second environment is a sealed connection. In particular in case of a first building and second building, the casing part may protrude through e.g., a hole in one of said buildings, wherein a space between the exterior surface of the casing part and the interior side of said hole in one of said buildings is sealed. This may prevent leaks in a connection between the casing part and the first environment and/or second environment. Where the casing part is mentioned, this advantage may also be achieved by at least one upper casing segment and/or at least one lower casing segment. It is however also conceivable that said sealing element is located on an interior surface of the shielding section. The sealing element may be in contact with an exterior portion of an exterior surface of an adjacent casing part, in particular an exterior surface of a casing part on a side facing away from said sealing section.

Preferably, in coupled condition, an expansion space, preferably a shielded expansion space, is provided or present between at least two adjacent casing parts. The expansion space is configured for allowing a thermal expansion and/or compression of the adjacent casing parts. Said expansion space is in particular configured to allow adjacent casing parts to expand or compress due to temperature fluctuations in the intermediate environment. This is in particular beneficial in case the coupling element is also configured for allowing said thermal expansion or compression of casing parts. In particular when a plurality of casing parts is provided to establish a longer insulated channel, expansion of said casing part becomes more important. Said expansion space is designed such that expansion and compression of the casing part, at least between temperatures of the intermediate environment situated between-30 degrees Celsius and 50 degrees Celsius, does not cause a gap between any of adjacent casing segments.

Preferably, the modular insulating system comprises a support structure. Preferably the support structure attached or attachable to an exterior side of at least one of the upper casing segment or lower casing segment, for supporting one or more casing parts. In particular, the support structure is entirely, or essentially only, attached to an exterior side of at least one of the upper casing segment or lower casing segment. Where reference is made to the embodiment comprising a support structure, it is noted that this aspect may be applied without presence of the upper casing segment or lower casing segment. It is known that an insulating channel is defined, where a support structure also carries a conveying system arranged within the insulating channel. This however requires the support structure to extent through the insulating channel, in particular through the lower casing segment. This is not beneficial since it negatively affects the insulating properties. To this end, the lower casing segment or upper casing segment according to the present invention are free of a through hole, in particular in the region of a support structure. As such, the insulating properties are considerably better over the prior art. A transporting conveyor arranged inside the casing part is preferably physically separated from and/or not connected to the support structure. Hence, components of the support structure remain outside the casing part. When a relatively big, insulated channel is to be formed between the first and second environment it may be beneficial to locally support the casing parts, or casing segments forming said casing part, to prevent the insulating system from collapsing under its weight. To this end, at least one support structure may be attached. Preferably the support structure supports at least one of the bottom casing segments. It is also conceivable that each of the bottom casing segments is supported by at least one support structure. In particular if a conveying system is provided inside the insulated channel, in particular resting on an interior surface of a bottom casing segments, it may be of benefit to properly support the system. Preferably, said support structure comprises at least one support bracket having at least one attachment surface, for attaching the support bracket to the at least one lower casing segment. At least one lower casing segment is preferably provided with at least one recessed channel, wherein said recessed channel is configured for receiving the at least one attachment surface of a support bracket. Said recessed channel allows for easy placement of the support brackets to the upper casing segment or lower casing segment. This may further contribute to a simpler installation of the insulated system according to the invention.

Preferably, the interior surface of at least one lower casing segment is configured for supporting a transport system, such as a conveyor belt. Said conveyor belt may allow for transporting products from one place to another. By placing the transport system such as the conveyor belt inside the insulated channel, the insulating system according to the present invention is able to achieve better insulating properties. This is due to the fact that in prior art insulating systems, the insulating part are conventionally built around an existing transport system. As such, there remains then always a gap where the insulating material encloses the carrying structure of the transport system. The present invention allows the entire transport system to be provided on an interior surface of an upper casing segment or lower casing segment. To this end, the interior surface of the at least one lower casing segment can be provided with mounting locations, for mounting a transport system thereon.

Preferably, at least one casing segment is provided with a drainage hole, for discharging moisture and/or liquid from the insulated channel. The drainage hole may additionally discharge small solid particles, such as parts of egg shells and/or feathers or the like. In case any moisture is able the enter the insulated channel, the moisture should be removed in order to prevent the moisture from damaging parts of the interior side, or possibly contaminating products transported through the insulated channel. This may be achieved by means of a drainage hole in at least one casing segment. Preferably, at least one drainage hole may be a (re) closable drainage hole. This may in particular be of benefit when all casing segments are substantially identical, and hence also the upper casing segments are provided with a drainage hole. Said drainage hole may for example be closed by means of a rubber plug which prevent some of the drainage holes, in particular those of the upper casing segments, from working. The use of at least one draining hole is for example beneficial for cleaning purposes.

The present invention is further related to a casing segment, in particular an upper casing segment and/or a lower casing segment for use in a modular insulating system according to the present invention. The same advantages apply with respect to the upper casing segment and/or lower casing segment as elaborated with respect to the insulating system. Therefore, the advantages with respect to the insulating system are hereby incorporated by reference with respect to the upper casing segment and/or lower casing segment.

The invention alternatively also relates to an assembly of a modular insulating system according to the present invention and at least one conveyor device.

The invention is further illustrated by means of the non-limitative set of clauses presented below.

1. Modular insulating system for establishing a thermally insulated connection between a first environment and a second environment, said first environment and second environment being mutually separated by an intermediate environment, in particular the open air, the modular insulating system being configured for enabling insulated transport of a product from the first environment to the second environment in particular through the intermediate environment, the system comprising:

at least one upper casing segment and at least one lower casing segment, wherein said upper casing segment and said lower casing segments are mutually connected or connectable, wherein at least one upper casing segment and at least one lower casing segment are at least partially composed out of a foamed polymer material, wherein, in connected condition, the upper casing segment and lower casing segment form a casing part, wherein said casing part defines an insulated channel having a first opening and a second opening, wherein the first opening of the insulated channel is configured to debouch into the first environment, and wherein the second opening of the insulated channel is configured to debouch into the second environment, such that the insulated channel defines an insulated transport bridge between the first environment and second environment, or Modular insulating system for establishing a thermally insulated connection between a first environment and a second environment, said first environment and second environment being mutually separated by an intermediate environment, in particular the open air, the modular insulating system being configured for enabling insulated transport of a product from the first environment to the second environment in particular through the intermediate environment, the system comprising:

at least one casing part, wherein said casing part defines an insulated channel having a first opening and a second opening, wherein the first opening of the insulated channel is configured to debouch into the first environment, and wherein the second opening of the insulated channel is configured to debouch into the second environment, such that the insulated channel defines an insulated transport bridge between the first environment and second environment.

2. Modular insulating system according to clause 1, wherein at least one upper casing segment and at least one lower casing segment are provided with complementary coupling profiles configured for mutually connecting said upper casing segment and said lower casing segment.

3. Modular insulating system according to clause 2, wherein at least one upper casing segment and/or at least one lower casing segment comprises two spaced apart edges, wherein a first coupling profile and a second coupling profile are provided on the respective first edge and second edge of the at least one upper casing segment and/or the at least one lower casing segment.

4. Modular insulating system according to any of the clauses 2-3, wherein at least a part of the complementary coupling profiles extends in a direction substantially parallel to the longitudinal direction of the insulated channel.

5. Modular insulating system according to any of the clauses 2-4, wherein at least one of the complementary coupling profiles comprises a tongue and/or groove, wherein the groove of a first coupling profile is configured for at least partially receiving a tongue of a connected second coupling profile of another casing segment.

6. Modular insulating system according to any of the preceding clauses, wherein at least one upper casing segment and/or at least one lower casing segment comprises at least one locking element, configured for mutually locking the upper casing segment and lower casing segment.

7. Modular insulating system according to any of the preceding clauses, wherein at least one upper casing segment and at least one lower casing segment are substantially identical.

8. Modular insulating system according to any of the preceding clauses, wherein the foamed polymer material is a polyurethane foam.

9. Modular insulating system according to any of the preceding clauses, wherein at least one upper casing segment comprises a rigid skin layer and/or wherein at least one lower casing segment comprises a rigid skin layer.

10. Modular insulating system according to clause 9, wherein the rigid skin layer forms integral part at least a part of the upper casing segment and/or of at least a part of the lower casing segment.

11. Modular insulating system according to any of the clauses 9 or 10, wherein at least one upper casing segment and/or at least one lower casing segment is essentially entirely composed out of a single polymer material, preferably polyurethane, wherein the rigid skin layer at least partially, preferably entirely, encloses the foamed polymer material, preferably the foamed polyurethane.

12. Modular insulating system according to any of the clauses 9-11, wherein the density of the skin layer, in particular an average density of the skin layer, is preferably situated between 350 kg/m3 and 550 kg/m3, preferably between 400 kg/m3 and 500 kg/m3, more preferably 450 kg/m3

13. Modular insulating system according to any of the clauses 9-12, wherein at least part of the skin layer has a density which is higher than the density of the foamed polymer material, preferably, the skin layer has a density which is at least two times bigger compared to the foamed polymer material, preferably at least three times, more preferably at least four times.

14. Modular insulating system according to any of the preceding clauses, wherein the modular insulating system comprises at least two, preferably a plurality of adjacent casing parts which are mutually connected or connectable, wherein each casing part comprises at least one upper casing segment and at least one lower casing segment, wherein the mutually connected adjacent casing parts together define an insulated channel having a first opening and a second opening.

15. Modular insulating system according to clause 14, wherein at least some of the adjacent casing parts are mutually at least partially overlapping.

16. Modular insulating system according to any of the clauses 14-15, wherein at least one upper casing segment and/or at least one lower casing segment comprises a shielding section, for shielding at least a portion of an adjacent casing segment.

17. Modular insulating system according to any of the clauses 14-16, wherein the shielding section is formed by a, preferably integral, widened part of the upper casing segment and/or lower casing segment.

18. Modular insulating system according to any of the clauses 14-17, wherein the shielding section is configured for at least partially receiving at least a part of an adjacent upper casing segment and/or for at least partially receiving at least a part of an adjacent lower casing segment, such that the adjacent casing segment at least partially overlaps with the shielding section.

19. Modular insulating system according to any of the clauses 14-18, wherein at least one casing part, or at least one upper casing segment and/or at least one lower casing segment, is provided with at least one coupling element, for, preferably releasably, coupling the casing part with at least one adjacent casing part.

20. Modular insulating system according to any of the clauses 14-19, wherein, in coupled condition an expansion space, preferably a shielded expansion space, is provided between at least two adjacent casing parts, for allowing a thermal expansion and/or compression of the adjacent casing parts.

21. Modular insulating system according to any of the preceding clauses, wherein at least one casing part, preferably at least one upper casing segment and/or at least one lower casing segment, comprises at least one sealing element configured for establishing a sealed connection between adjacent casing parts.

22. Modular insulating system according to clause 21, wherein at least a part of an exterior surface and/or at least a part of an interior surface of at least one upper casing segment and/or at least a part of an exterior surface and/or at least a part of an interior surface of at least one lower casing segment comprises a sealing element.

23. Modular insulating system according to any of the preceding clauses, comprising at least one support structure, wherein said support structure is attached or attachable to an exterior side of at least one casing part of the upper casing segment or lower casing segment, for supporting one or more casing parts.

24. Modular insulating system according to any of the preceding clauses, wherein at least one lower casing segment comprises at least one support surface for supporting at least part of a transport device, such as a conveyor belt.

25. Modular insulating system according to any of the preceding clauses, wherein at least one casing segment, in particular at least one lower casing segment comprises at least one drainage hole, for discharging moisture and/or liquid from the insulated channel.

26. A casing segment for use in a modular insulating system as defined in any of the clauses 1-25.

BRIEF DESCRIPTION OF THE DRAWINGS

The terms Fig., Figs., Figure, and Figures are used interchangeably in the specification to refer to the corresponding figures in the drawings.

The present invention will hereinafter be further elucidated based on the following non-limitative figures, wherein.

Within these figures, similar reference numbers correspond to similar or equivalent elements or features.

DESCRIPTION OF THE INVENTION

Figure 1:
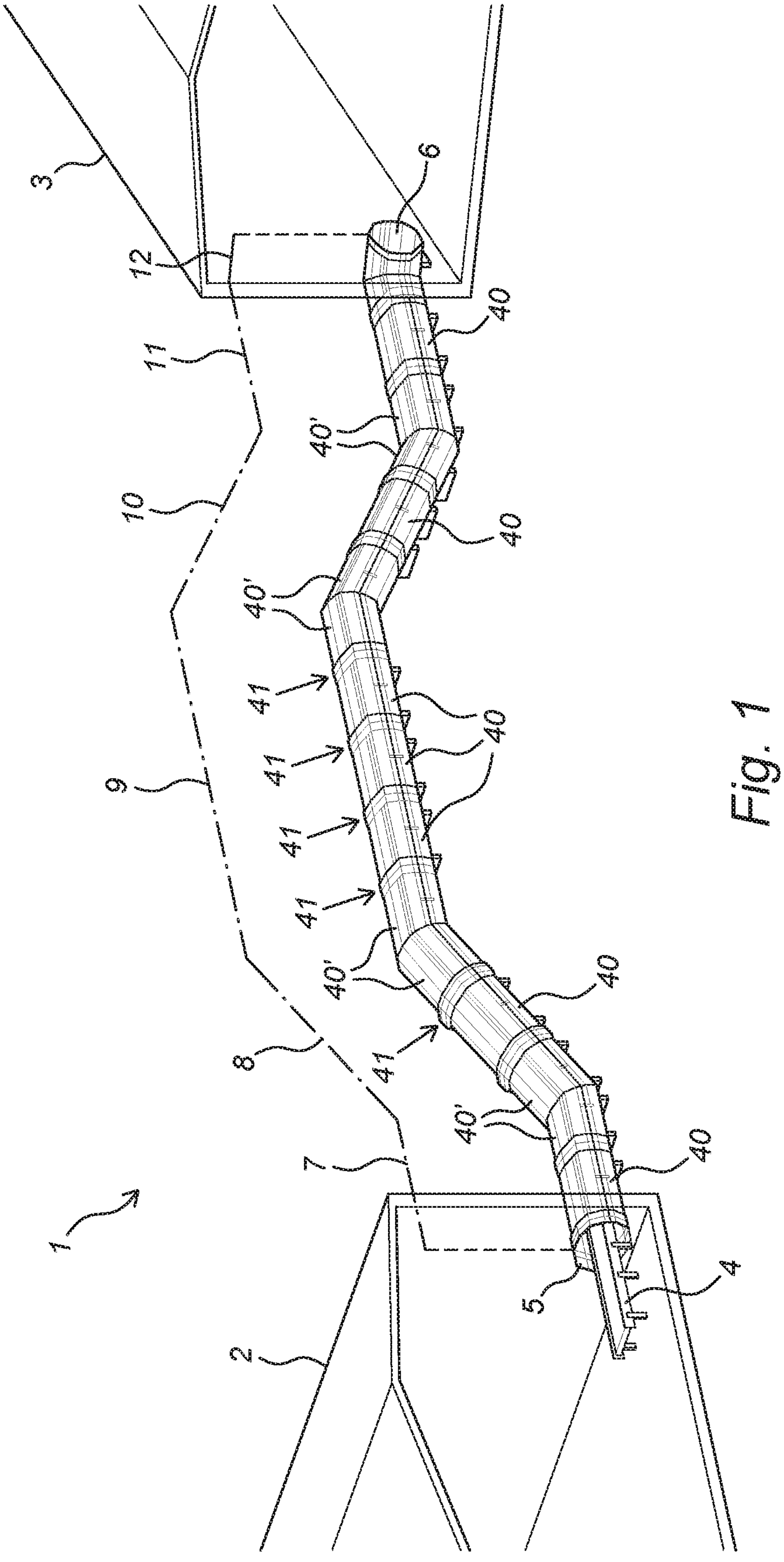
FIG. 1 shows a perspective view of a schematic representation of a first possible embodiment of a modular insulating system according the present invention.

FIG. 1 shows a perspective view of the modular insulating system 1 according to an embodiment of the invention. The modular insulating system 1 as shown in the figure is connected to a first environment 2 and a second environment 3, which are mutually separated by an intermediate environment, for example the open air. In this non-limitative figure, the first environment 2 and second environment 3 may in particular be a poultry house 2 and a hall 3, such as a process hall 3 for processing e.g., eggs from poultry inside the poultry house 2. The intermediate environment may for example be an outdoor environment. The poultry house 2 and hall 3 are mutually separated from each other. However, when delicate consumable products, such as eggs, are to be transported from said poultry house 2 to the hall 3, they are typically subjected to a temperature fluctuation. That is, the poultry house 2 and hall 3 may be at a constant temperature of e.g., 18 degrees Celsius, whereas the outdoor temperature of the outdoor environment could fluctuate between typically −15 degrees Celsius and 40 degrees Celsius. Especially since the poultry house 2 and hall 3 may be situated more than 20 m away from one another, the temperature fluctuation of the product may be substantial in case it is transported through the outdoor environment at a temperature of −15 degrees Celsius or 40 degrees Celsius. Although this figure describes a poultry house 2 and hall 3, the invention is not limited thereto. It is also conceivable that the first environment 2 is a first manufacturing location 2, and the second environment is a second manufacturing location 3. The product to be transported therefore is also not limited to the present example, but may be any product that is affected negatively when subject to large temperature fluctuations.

The modular insulating system 1 as shown in FIG. 1 comprises a plurality of mutually connected casing parts 40, 40'. Said mutually connected casing parts 40, 40', define an insulated channel between the first environment 2 and second environment 3. Said insulated channel defines a first opening 5 and a second opening 6, wherein the first opening 5 in this figure debouches into the first environment 2. The second opening 6 in this embodiment debouches into the second environment 3. As such, an insulated transport bridge is created between said first environment 2 and second environment 3 by the modular insulating system according to the present invention. The insulated transport bridge allows products to be transported while being thermally insulated from the intermediate environment. This allows products to be protected from the potential temperature difference between the first environment 2 and the intermediate environment, and between the second environment 3 and the intermediate environment. In order to enhance insulating properties compared to known solutions even further, the present invention is configured for internally carrying a transport system 4, such as a conveyor 4. Said conveyor 4 may be mounted to and in particular within said casing parts 40, 40'. This prevents the need to apply insulating material around a mounting structure of the conveyor 4, and thus may reduce the leaks of air from the intermediate environment into the insulated channel. The casing parts 40, 40', in particular the casing segments forming the casing part 40, 40' are at least partially composed out of a foamed polymer material. In particular foamed polyurethane having a skin layer turned out to be a good insulator, as well as providing the required structural properties for carrying the conveyor 4 internally. The modular insulating system 1 in this particular figure comprises in total six segments 7, 8, 9, 10, 11, 12. Said segments 7, 8, 9, 10, 11, 12 extend in different directions, in order to form an arbitrary connection between the first environment 2 and second environment 3. As shown, at least one segment 9 is elevated with respect to the other segments. This may for example be of benefit in case the modular insulating system 1 has to pass an obstacle, such as a road between the first environment 2 and second environment 3. In order to achieve this, certain casing parts 40' are cut at an angle, such that the insulated channel forms a bend. As shown in the figure, said bend may be an upwardly directed bend, such as between segment 7 and 8, and between segment 10 and 11. The bend may also be a downward bend, such as between segment 8 and 9, and between segment 9 and 10. However, the bend may also be a left or right bend, such as shown between segment 11 and 12. Hence, the modular insulating system 1 is not only modular in respect of the length of the insulated channel, but also in respect of the shape of said insulated channel. The length of the channel may be arbitrarily adjusted by adding casing parts 40, 40' or removing casing parts 40, 40'. The shape of said channel may be adjusted by cutting adjacent casing parts 40, 40' such that they mutually connect at an angle. In order to further insulate the insulated channel from the intermediate environment, the casing parts 40, 40', in particular the casing segments, may be provided with a shielding section 41. Said shielding section 41 allows adjacent casing parts 40, 40' to mutually partially overlap. In particular, one end of a first casing part 40, 40' may be at least partially received in a shielding section 41 of an adjacent casing part. An additional benefit of the shielding section 41 may be to at least partially absorb expansion and/or contraction of the modular insulating system 1. That is, adjacent casing parts 40, 40' may expand and/or contract without a gap between said adjacent casing parts 40, 40' being formed and thus maintaining proper insulating properties. This makes the modular insulating system 1 in particular suitable for large temperature fluctuations.

Figure 2:
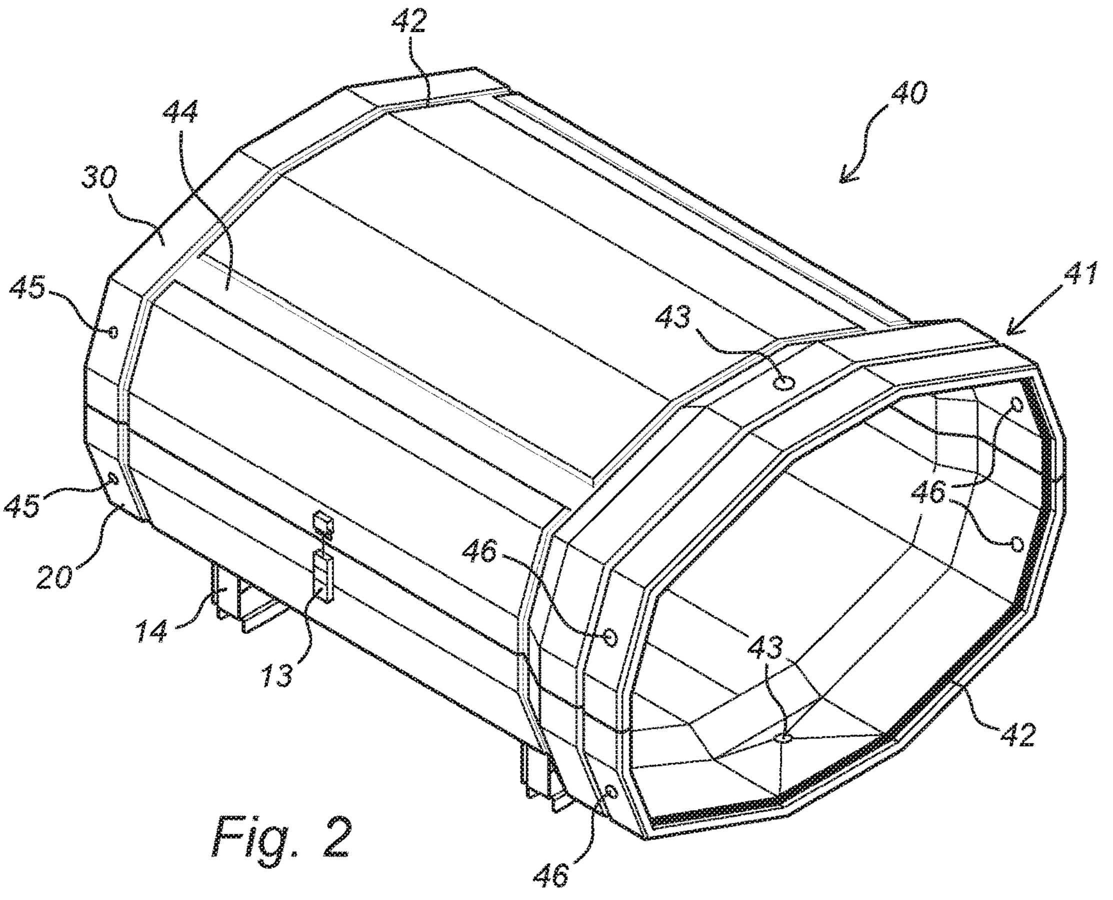
FIG. 2 shows a perspective view of a casing part for use in the modular insulating system.

FIG. 2 shows a casing part 40 according to an embodiment of the present invention. The casing part 40 as shown comprises an upper casing segment 30 and a lower casing segment 20. Said upper casing segment 30 and lower casing segment 20 are mutually connected in the shown configuration. The casing part 40 further comprises a locking element 13 which is configured for mutually locking the upper casing segment 30 to the lower casing segment 20. Said locking element 13 is in this example configured to establish a releasable locking connection. In the shown embodiment, the locking element 13 is formed by a latch system 13. One part of the latch system 13 is connected to the upper casing segment 30, such as a locking portion, which may releasably engage with a receiving portion that may be provided to the bottom casing segment 20, such as a hook for receiving a part of the latch 13. The present invention is however not limited to this example of the locking element. It is conceivable that kinematic inverse solutions also may be applied, or different types of latch systems 13, or other locking elements 13. The figure further shows that one end of the casing part 40 comprises a shielding section 41, which is in particular a widened portion with respect to the remainder of the casing part 40. Said shielding section is in this embodiment integrally formed with the remainder of the casing part 40. This is in particular beneficial for the insulating properties of the system. The embodiment of the casing part 40 as shown comprises multiple drainage holes 43. In the shown embodiment, a drainage hole 43 of the upper casing segment 30 is closed by means of a plug. The interior side of the bottom casing segment 20, in particular the area near the drainage hole 43 may be slightly recessed, or form a bowl like shape, such that the drainage hole 43 is located in the lowest point of the lower casing segment 20. Moreover, said slightly recessed, or bowl like shape may contribute to the drainage of any liquid that is inside the casing part 40. On a side of the casing part 40 opposite to the shielding section 41 a sealing element 42 may be located. Said sealing element 42 may be e.g., a rubber element 42. Said sealing element 42 may be in contact with an interior portion of a shielding section 41 of an adjacent casing part 40. As such, the sealing element 42 may contribute to the insulating properties since it seals the overlap between two adjacent casing parts 40 with respect to the intermediate environment, in case multiple casing parts 40 are applied. It is however also conceivable that said sealing element 42 is located on an interior surface of the shielding section 41. The sealing element 42 may be in contact with an exterior portion of an exterior surface of an adjacent casing part 40, in particular an exterior surface of a casing part 40 on a side facing away from said sealing section 41. The casing part 40 may further comprise coupling elements 45, 46, for, preferably releasably, coupling the casing part 40 with at least one adjacent casing part. In the shown embodiment, the coupling elements 45, 46 are formed by holes 45, 46, in the upper casing segment 30 and lower casing segment 20, wherein at least one hole 46 is provided in a part of the shielding section 41. The holes 45, 46 are provided such that, when adjacent casing parts overlap, also the holes 45, 46 at least partially overlap. This allows a co-acting (complementary) coupling element such as a bolt or nut to mutually connect casing parts 40. In order to account for the expansion and/or contraction of casing parts, one of the coupling elements 46 is configured as a slot, or elongated hole 46. Even though the adjacent casing parts 40 can be bolted together, the slot allows movement of said adjacent casing parts 40 relative to one another in longitudinal direction. The figure further shows part of a support structure 14, which is mounted on an exterior side of the lower casing segment 20. In particular the support structure 14 is provided in a recessed channel 44 of the lower casing segment.

Figure 3:
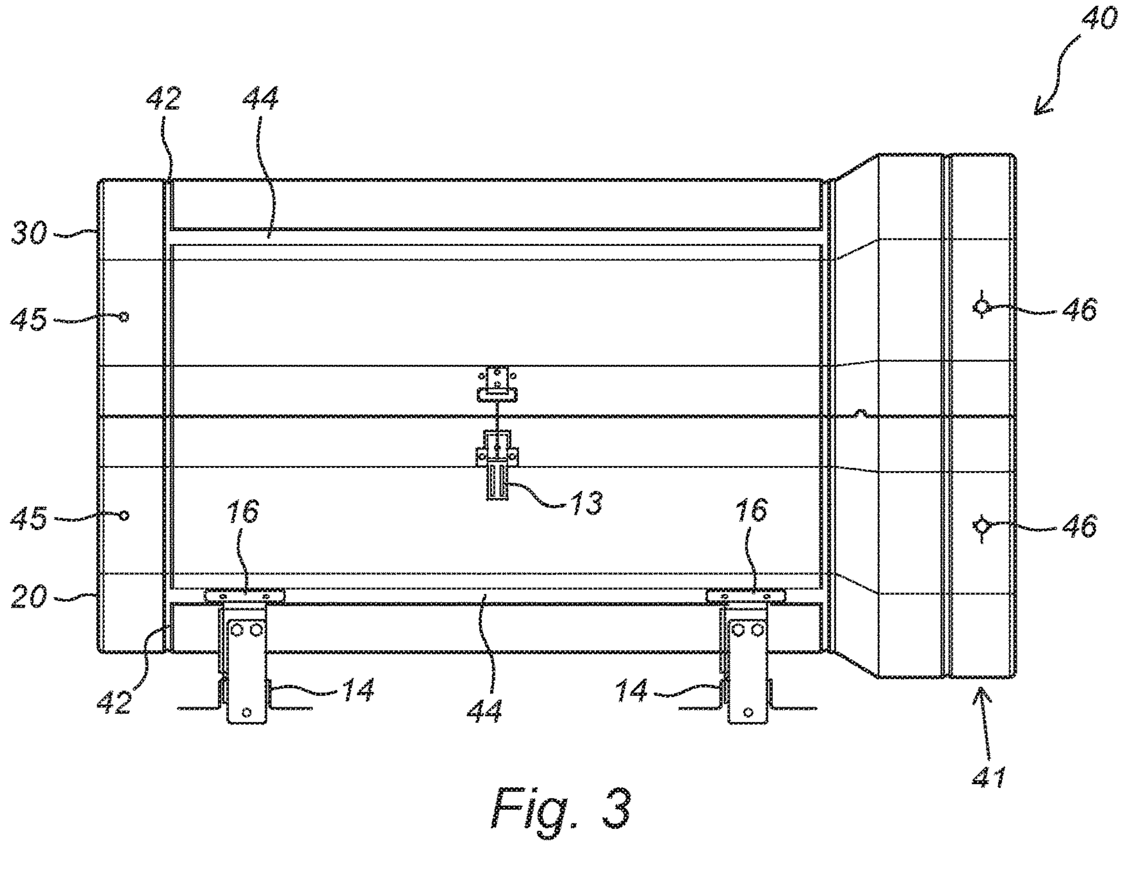
FIG. 3 shows a side view of the casing part as shown in FIG. 2.

The casing part 40 as shown in this figure is also shown in a side view perspective in FIG. 3. In this figure, the shielding section 41 clearly widens with respect to the overall body of the casing part 40. Also, the sealing element 42 slightly protrudes with respect to the upper casing segment 30 and lower casing segment 20, as can be seen in the figure. The support structure 14 provides support for the casing part 40. It is preferred that the said support structure 14 does not protrude through the casing part 40. A part of the support structure 14, in particular a mounting bracket 16 thereof is configured to fit in the recessed channel 44 of the lower casing segment 20. As such, the support structure 14 remains only on the outside of the lower casing segment 20. As such, the thermal insulating properties are maintained. That is, it is not required to make a hole in the lower casing segment 20 for allowing the support structure 14 to carry a transporting conveyor arranged inside the casing segment 20. This is due to the fact that the mounting bracket 16 is attached only to the outside surface of the lower casing segment 20.

Figure 4:
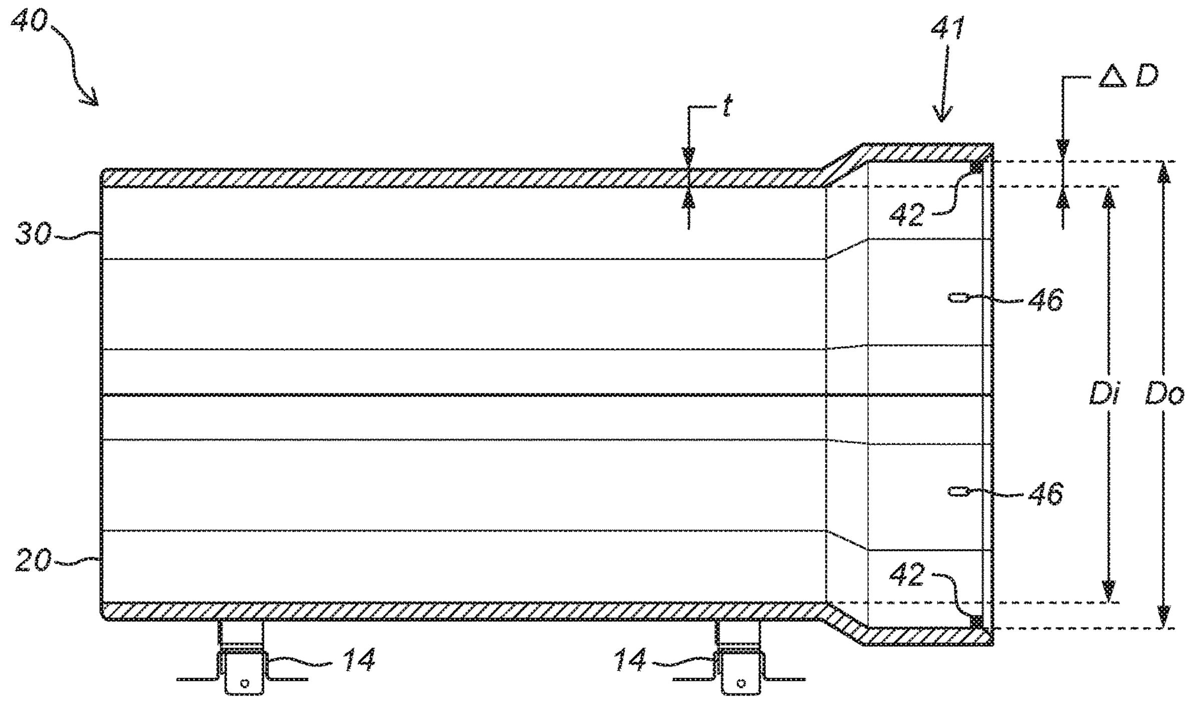
FIG. 4 shows a cross section in a length direction of a casing part as shown in FIGS. 2 and 3.

FIG. 4 shows a cross section of the casing part 40 as shown in FIGS. 2 and 3. This figure allows to indicate the function of the shielding section 41. Said shielding section 41, as discussed earlier, is formed by a locally widened end portion of the casing part 40. That is, the shielding section 41 protrudes with respect to the casing part 40. Therefore, the interior diameter Do in a region of the shielding section 41 is larger compared to the interior diameter Di in a region at a distance of the shielding section 41. Preferably, the difference in internal diameter DeltaD, is substantially identical to twice the casing thickness t. As such, this allows an end of a casing part 40 to be received tightly in a shielding section 41 of an adjacent casing part 40.

Figure 5:
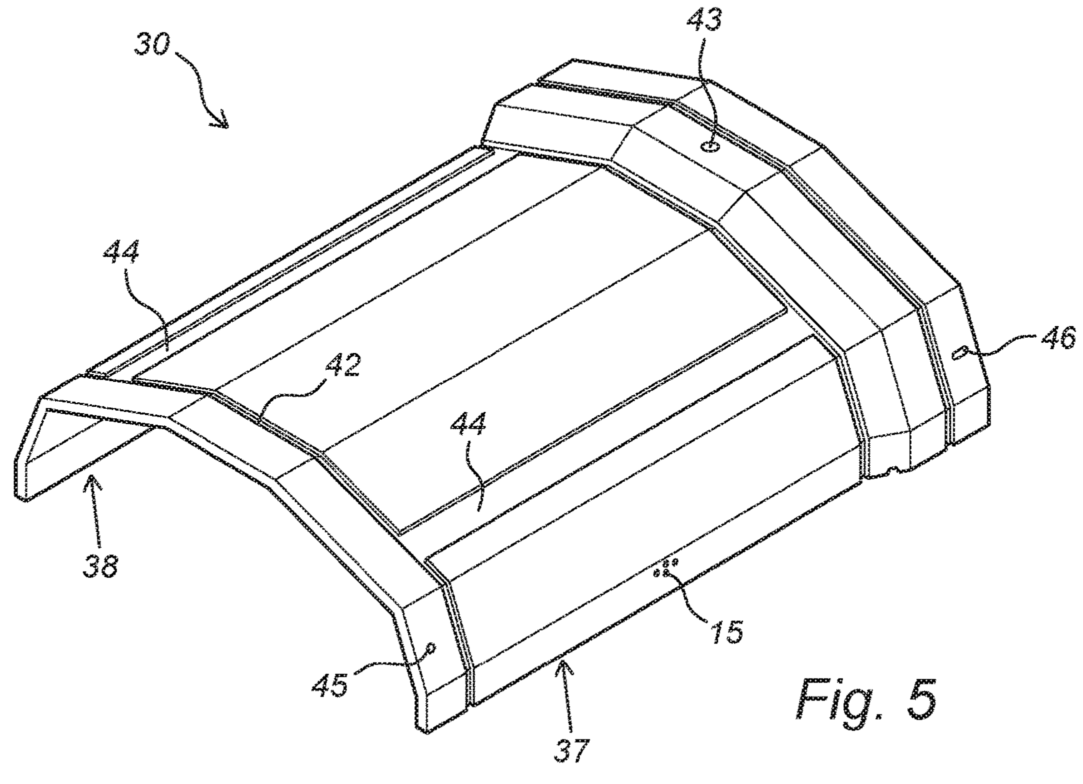
FIG. 5 shows a casing segment according to a possible embodiment of the invention.

FIG. 5 shows a perspective view of an upper casing segment 30 which can be applied in a system according to the present invention. Although the upper casing segment 30 is shown, the casing segments 20, 30 according to the present invention may be substantially identical, and hence any description with respect to an upper casing segment 30 may be applicable to a corresponding lower casing segment 20 equally. The substantially arched upper casing segment 30 shows a first edge 37 and a second edge 38, wherein said edges 37, 38 may be provided with coupling profiles, for example a first coupling profile, and a second coupling profile respectively, configured for co-action with complementary coupling profiles of a lower casing segment 20. The figure indicates the coupling elements 45, 46, which are formed by holes in the upper casing segment 30. One of said coupling elements 46 is formed by an elongated channel, in order to account for thermal expansion and/or thermal contraction of casing parts 40. At least one side, preferably both sides, of the upper casing segment 30 is provided with a mounting location 15 for mounting thereon a locking element 13, such as a latch. One exterior surface comprises a recessed part 44, which may be configured for receiving at least a part of a support structure 14.

Figure 6:
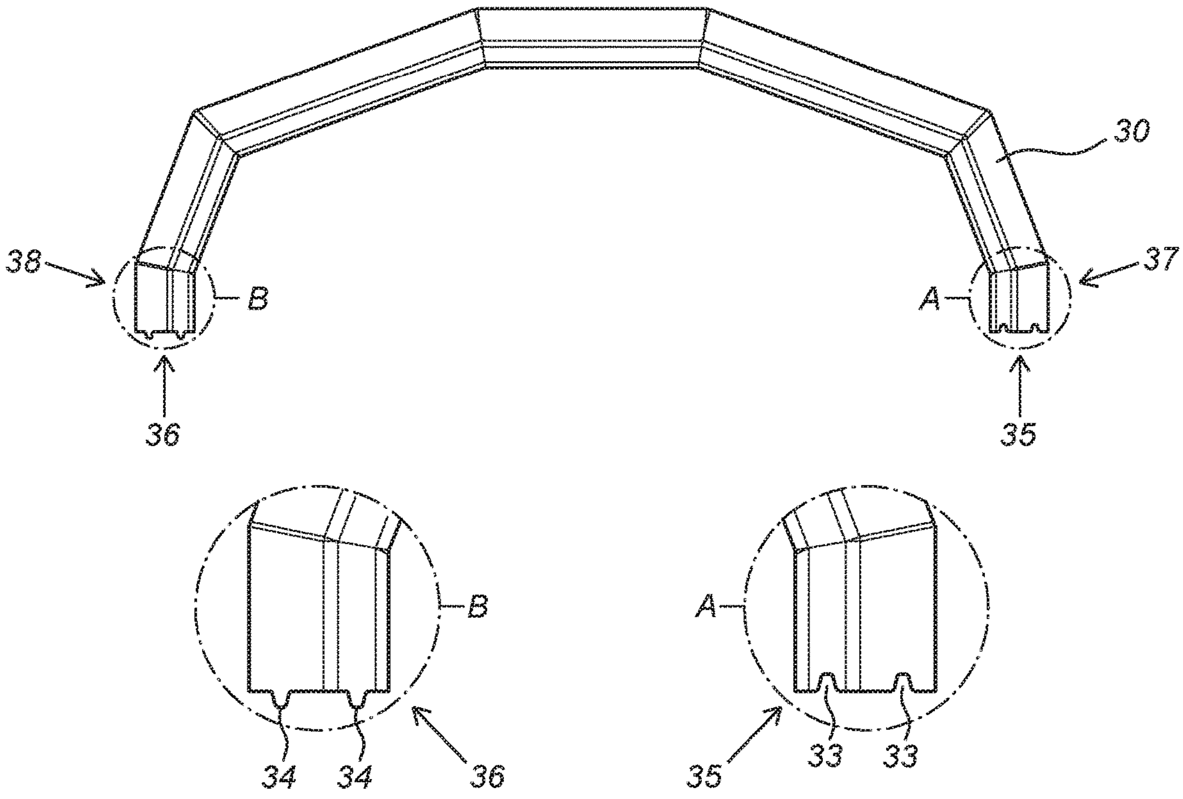
FIG. 6 shows a cross section in a width direction of a casing segment.

FIG. 6 shows a cross section of an upper casing part 30, for example as shown in FIG. 5. The upper casing segment 30 shows a first edge 37 and a second edge 38, wherein said edges 37, 38 are provided with a first coupling profile 35, and a second co-acting coupling profile 36 respectively. The first coupling profile 35 is configured for co-acting with a second coupling profile 36 of a lower casing segment 20. The first coupling profile 35 and second co-acting coupling profile 36 respectively which are provided on the first edge 37 and second edge 38 are shown in more detail in the respective circles A and B. In these circles A, B it can be seen that the first coupling profile 35 is formed by a double groove 33 in this embodiment. Said double grooves 33 extend substantially parallel with respect to each other. It can also be seen that the second coupling profile 36 is formed by a double tongue 34 in this embodiment. Said grooves 33 are in particular configured for at least partially receiving a tongue 34 of a lower casing segment 20.

Figure 7:
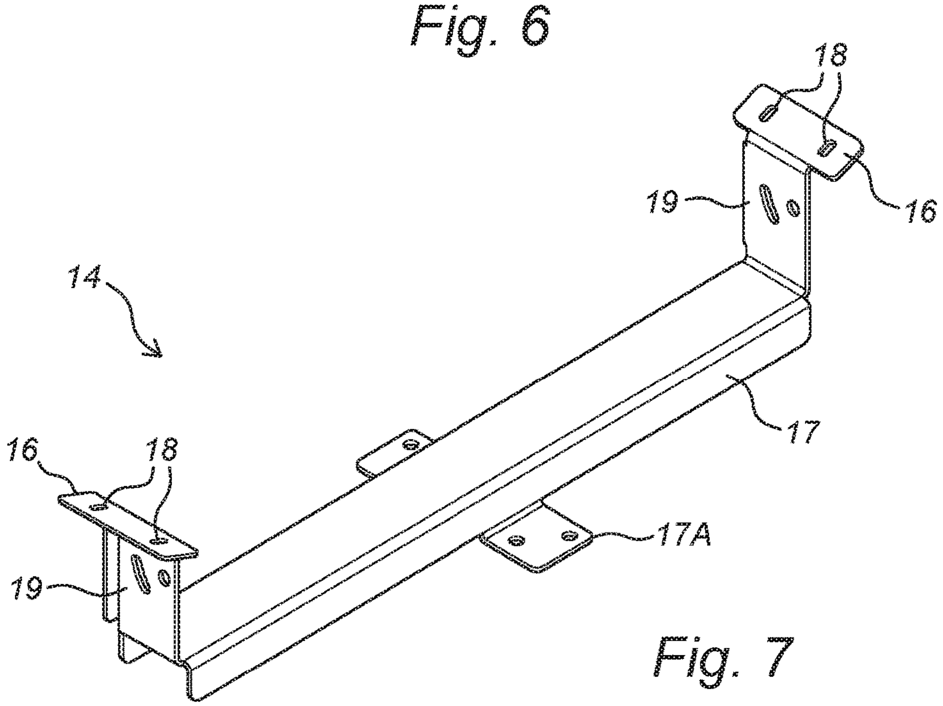
FIG. 7 shows a support structure for use in the modular insulating system according to the present invention.

FIG. 7 shows an embodiment of a support structure 14 which can be applied in a system according to the present invention. Although the support structure 14 shown in this figure is relatively low, the invention is not limited thereto. The skilled person would realize that said support structure 14 may be applied in different heights, according to the specification of a casing part 40 in the modular insulating system 1. The support structure 14 comprises a base structure 17, for rigidly mounting the support structure 14 to a ground surface. Although the support structure 14 may also be placed on the ground without mounting elements, it is preferred that it is mounted to the ground, to this end a mounting plate 17A is provided. The mounting plate 17A comprises at least one hole, preferably at least two for mounting the support structure 17 to the ground surface. Further, the support structure 14 comprises two support brackets 16, attached via upright parts, to the base structure 17. In said support bracket 16 two mounting holes 18 are provided, for mounting the support bracket, and therewith the support structure 14, to a casing part 40, in particular to a bottom casing segment 20. Since some of the casing parts 40 may be positioned slightly inclined, it is preferred that said support structure 14 may take this into account. To this end the support structure 14 is provided with an adjustment element 19, for adjusting an angle of the support bracket 16 with respect to the base structure 17. Preferably, the angle may be freely adjusted. This allows the support structure 14 to be modular, such that only a single type of support structure 14 may be used for a plurality of casing parts 40.

The above-described inventive concepts are illustrated by several illustrative embodiments. It is conceivable that individual inventive concepts, including inventive details, may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application and/or alternative embodiment.

The ordinal numbers used in this document, like "first", "second", and "third" are used only for identification purposes. Hence, the use of expressions like a "second" component, does therefore not necessarily require the co-presence of a "first" component. By "complementary" components is meant that these components are configured to co-act with each other. However, to this end, these components do not necessarily have to have complementary forms. The verb "comprise" and conjugations thereof used in this patent publication are understood to mean not only "comprise", but are also understood to mean the phrases "contain", "substantially consist of", "formed by" and conjugations thereof.

Where product is mentioned in this application, this should be understood broadly. In particular, the wording product should be understood to encompass both consumable products and non-consumable products. Non-consumable products may for example be metal products which may expand or contract when subjected to temperature fluctuations. On the other hand, consumable products may for example be eggs, which are to be transported from a poultry house to a different building separated from the poultry house. Hence, any product which may be subjected to a temperature difference during a transport thereof should be within the scope of this application.

The invention claimed is:

1. A modular insulating system for establishing a thermally insulated connection between a first environment and a second environment, said first environment and second environment being mutually separated by an intermediate environment, in particular the open air, the modular insulating system being configured for enabling insulated transport of a product from the first environment to the second environment in particular through the intermediate environment, the system comprising:

at least one upper casing segment and at least one lower casing segment, wherein said upper casing segment and said lower casing segments are mutually connected or connectable, wherein at least one upper casing segment and at least one lower casing segment are at least partially composed out of a foamed polymer material, wherein, in connected condition, the upper casing segment and lower casing segment form a casing part, wherein said casing part defines an insulated channel having a first opening and a second opening, wherein the first opening of the insulated channel is configured to debouch into the first environment, and wherein the second opening of the insulated channel is configured to debouch into the second environment, such that the insulated channel defines an insulated transport bridge between the first environment and second environment.

2. The modular insulating system according to claim 1, wherein at least one upper casing segment and at least one lower casing segment are provided with complementary coupling profiles configured for mutually connecting said upper casing segment and said lower casing segment.

3. The modular insulating system according to claim 2, wherein at least one upper casing segment and/or at least one lower casing segment comprises two spaced apart edges, wherein a first coupling profile and a second coupling profile are provided on the respective first edge and second edge of the at least one upper casing segment and/or the at least one lower casing segment.

4. The modular insulating system according to claim 2, wherein at least a part of the complementary coupling profiles extends in a direction substantially parallel to the longitudinal direction of the insulated channel.

5. The modular insulating system according to claim 2, wherein at least one of the complementary coupling profiles comprises a tongue and/or groove, wherein the groove of a first coupling profile is configured for at least partially receiving a tongue of a connected second coupling profile of another casing segment.

6. The modular insulating system according to claim 1, wherein at least one upper casing segment and/or at least one lower casing segment comprises at least one locking element, configured for mutually locking the upper casing segment and lower casing segment.

7. The modular insulating system according to claim 1, wherein at least one upper casing segment and at least one lower casing segment are substantially identical and/or wherein the foamed polymer material is a polyurethane foam.

8. The modular insulating system according to claim 1, wherein at least one upper casing segment comprises a rigid skin layer and/or wherein at least one lower casing segment comprises a rigid skin layer.

9. The modular insulating system according to claim 8, wherein the rigid skin layer forms an integral part of at least a part of the upper casing segment and/or of at least a part of the lower casing segment and/or wherein at least one upper casing segment and/or at least one lower casing segment is essentially entirely composed out of a single polymer material, wherein the rigid skin layer at least partially encloses the foamed polymer material.

10. The modular insulating system according to claim 8, wherein at least part of the skin layer has a density which is higher than the density of the foamed polymer material.

11. The modular insulating system according to claim 1, wherein the modular insulating system comprises at least two adjacent casing parts which are mutually connected or connectable, wherein each casing part comprises at least one upper casing segment and at least one lower casing segment, wherein the mutually connected adjacent casing parts together define an insulated channel having a first opening and a second opening.

12. The modular insulating system according to claim 11, wherein at least some of the adjacent casing parts are mutually at least partially overlapping and/or wherein at least one upper casing segment and/or at least one lower casing segment comprises a shielding section, for shielding at least a portion of an adjacent casing segment.

13. The modular insulating system according to claim 12, wherein the shielding section is formed by a widened part of the upper casing segment and/or lower casing segment.

14. The modular insulating system according to claim 12, wherein the shielding section is configured for at least partially receiving at least a part of an adjacent upper casing segment and/or for at least partially receiving at least a part of an adjacent lower casing segment, such that the adjacent casing segment at least partially overlaps with the shielding section.

15. The modular insulating system according to claim 11, wherein at least one casing part, or at least one upper casing segment and/or at least one lower casing segment, is provided with at least one coupling element, for coupling the casing part with at least one adjacent casing part.

16. The modular insulating system according to claim 11, wherein, in coupled condition an expansion space is provided between at least two adjacent casing parts, for allowing a thermal expansion and/or compression of the adjacent casing parts.

17. The modular insulating system according to claim 1, wherein at least one casing part comprises at least one sealing element configured for establishing a sealed connection between adjacent casing parts, wherein at least a part of an exterior surface and/or at least a part of an interior surface of at least one upper casing segment and/or at least a part of an exterior surface and/or at least a part of an interior surface of at least one lower casing segment comprises a sealing element.

18. The modular insulating system according to claim 1, comprising at least one support structure, wherein said support structure is attached or attachable to an exterior side of at least one casing part of the upper casing segment or lower casing segment, for supporting one or more casing parts.

19. The modular insulating system according to claim 1, wherein at least one lower casing segment comprises at least one support surface for supporting at least part of a transport device and/or wherein at least one casing segment comprises at least one drainage hole, for discharging moisture and/or liquid from the insulated channel.

20. A casing segment for use in a modular insulating system as defined in claim 1.

* * * * *